United States Patent [19]

Hubbard et al.

[11] 4,090,834

[45] May 23, 1978

[54] REMOVABLE MOLD FOR FORMING HIGH FREQUENCY ANTENNAS

[75] Inventors: Howard H. Hubbard, Scituate; Thomas P. Walsh, Marshfield, both of Mass.

[73] Assignee: Antennas for Communications, Inc., Ocala, Fla.

[21] Appl. No.: 550,574

[22] Filed: Feb. 18, 1975

Related U.S. Application Data

[63] Continuation of Ser. No. 328,370, Jan. 31, 1973, abandoned.

[51] Int. Cl.[2] ........................ B29C 13/00; B29C 13/04

[52] U.S. Cl. .................................... 425/470; 249/184; 343/912; 425/90; 425/175; 425/182; 425/436 R

[58] Field of Search ............. 249/160, 63, 175, 66–68, 249/184; 425/403, 470, 90, 175, 180, 182, 450.1, 436 R; 343/912

[56] References Cited

U.S. PATENT DOCUMENTS

| | | | |
|---|---|---|---|
| 1,604,274 | 10/1926 | Gammeter | 249/63 X |
| 1,984,186 | 12/1934 | Haber | 249/63 X |
| 2,273,055 | 1/1942 | Manson | 249/175 |
| 2,655,701 | 10/1953 | Hites | 249/175 X |
| 2,882,951 | 4/1959 | Fuchs, Jr. et al. | 425/403 X |
| 3,152,365 | 10/1964 | Fisher | 249/68 X |
| 3,314,091 | 4/1967 | Levaggi | 425/403 X |
| 3,632,277 | 1/1972 | Stalter | 249/63 |

*Primary Examiner*—Robert L. Spicer, Jr.

*Attorney, Agent, or Firm*—Jerome Goldberg

[57] ABSTRACT

A removable mold for forming high frequency antennae, such as a horn-reflector antenna. The removable mold may comprise a paraboloid-cylindrical section and a pair of half cone shells for forming respectively the paraboloid-cylindrical portion and the cone portion of the antenna. In assembling the mold, the shells are secured together and then the cylindrical section is fastened to the assembled shells. After the antenna has been formed, the mold is disassembled by first removing the paraboloid-cylindrical section, thereafter removing one of the shells and then the remaining shell; and all such mold parts being removed via the radiating aperture of the paraboloid-cylindrical portion of the antenna.

33 Claims, 21 Drawing Figures

REMOVABLE MOLD FOR FORMING HIGH FREQUENCY ANTENNAS

REFERENCE TO PRIOR APPLICATION

This application is a continuation of our Patent Application entitled "One Piece Horn-Reflector Antenna and Method and Apparatus For Forming Same", Ser. No. 328,370, filed on Jan. 31, 1973, and now abandoned.

BACKGROUND OF THE INVENTION

The invention relates generally to a mold for forming horn reflector antennae; and more particularly, relates to a mold for forming conical horn antennae.

A conical horn reflector antenna is generally formed by the right angled intersection of a cone with a cylinder, although other angular relationships may be suitable. The intersection defines the perimeter of an offset paraboloid section with respect to the X and Y orthogonal axis. The parabolic focal length for a right-angled horn reflector is one half the length of the axis of the cone between the apex and the intersection with the offset paraboloid. Thus, the conical horn reflector antenna includes three geometric shapes; a conical horn, a parabolic section and a cylindrical section. Spherical radio-frequency (RF) waves from the conical horn diverge on the parabolic reflector, and are transformed into planar wave fronts, which radiate from the circular projectile aperture at the outer end of the cylindrical section.

The RF performance of the conical horn antenna is critically dependent upon the accuracy in forming the parabolic reflecting surface and the maintenance of the feed source at the exact focal point of the parabolic surface. Performance is also dependent upon the mechanical and electrical contact at the intersecting joints between the various sections of the antenna. Any gaps at such intersections may result in appreciable RF leakage, which may significantly affect the radiation pattern and render the antenna virtually useless. Usually, the antenna is filled with dried pressurized gases and an air tight membraneous window having no effect on the passage of electromagnetic energy is used to enclose the projectile circular aperture of the antenna. If the dried gases within the antenna are dissipated via any air gaps, moist air may enter the antenna and condense into water. An appreciable accumulation of water will substantially degrade performance, and may even cause the antenna to become inoperative.

Generally, the horn reflector antennae are formed by sheet metal fabrication or fiberglas molding. Sheet metal fabrication requires independent formation of each geometric shape with a plurality of metal pieces.

In sheet metal fabrication, optimum tolerances of the various parts, individually and after assembly, are difficult to maintain, and, frequently varied so appreciably from the optimum to cause measurable degradation in the antenna performance. Often, the economics made optimum design tolerances unfeasible. Furthermore, the multiplicity of joints between parts compounded the probability of RF and air leakage problems.

In prior fiberglas constructions, usually the cone part of the antenna was fabricated from one tool and a combined paraboloid and cylindrical part from another tool. In some instances, when optimum performance was not required, only the cone and paraboloid parts were independently formed, and the cylindrical portion was omitted. However, the elimination of the cylindrical portion degrades antenna performance by removing an important shielding element. Although prior fiberglas techniques enabled antenna constructions to be made in multiple sections, significant errors were made in the relationship of the component antenna sections during assembly. Furthermore the joint(s) at the interface of the attached sections was still a source of significant RF and gas leakage.

An example of a multiple section fiberglas antenna construction may be found in U.S. Pat. No. 3,510,873 (Trevisan-1970). In an embodiment disclosed therein, the antenna included a cone unit and a paraboloid-cylindrical unit connected together at a flanged joint. These assembled units were then connected to a feed or receive wave guide arrangements by a "union" or "transitional" element. The union element was bolted at one end to the cone and at the other end to the wave guide. To achieve optimum performance, the focal point of the parabolic reflector must be coincident with the central axis of the wave guide. An error or deviation of the union element from the optimum position, in either the axial or radial direction, will have substantial, if not the greatest single effect on the electrical performance of the antenna. Thus, the Trevisan antenna, although referred to as a two unit construction is actually a three part construction consisting of the paraboloid-cylindrical unit, the cone unit, and the union element unit.

The aforesaid Trevisan patent also refers to a single unit antenna construction. The union element, which is so essential for antenna performance was not considered as an antenna element. Thus, this antenna is actually a two unit antenna, to wit: the paraboloid-cylindrical and cone unit and the union element unit. The subject invention, on the other hand, provides a single-piece antenna having the union element as an integral part thereof, without requiring mechanical connection between the horn and such union element.

As aforestated, the Trevisan Patent refers to a single piece horn-reflector antenna (which does not include the union element), but it is noted that the Trevisan patent does not disclose the means of tooling for fabricating the single-piece antenna. The invention herein discloses positive means for forming a single piece antenna including a union element, and some means enables repeatable fabrication of such single piece antennae.

In prior fiberglas methods, flexible tools or molds were frequently used for forming one or more of the various units of the antenna. Thus, to subsequently remove the tool, it was necessary to distort or bend the tool during its removal from the fiberglas section. Such distortion at times became permanent, and any sections subsequently formed from the same tool, were dimensionally imperfect. Flexible tooling is generally undesirable since it introduces another source for developing dimensional error. The subject invention overcomes this problem by disclosing means for forming a single-piece horn-reflector, antenna, by the use of rigid dimensionally stable tooling, which may be repeatedly reused without effecting mechanical or electrical antenna specifications.

It is therefore, a primary object of this invention to provide a mold to enable horn-reflector antenna to be formed in a single piece.

Another object is to provide a mold to enable accurate and repeatable spatial relationship to be maintained between the horn, and the other geometric sections of the horn-reflector antenna.

Another object is to provide a mold, which enables strict tolerances of antenna dimensions to be maintained and easily repeated in subsequent antennae fabrications with the same mold; and thereby providing substantially identical performance between antennae.

Another object is to provide a mold which is easily assembled prior to forming the antenna and easily disassembled and removed from the antenna after it is fabricated.

Another object is to provide a mold consisting entirely of rigid and dimensionally stable parts.

Another object is to provide a mold to form horn-reflector antenna having one section for forming a paraboloid-cylinder portion of the antenna and two sections for forming the horn portion of the antenna.

Another object is to utilize substantial portions of the same tooling to form various antenna configurations in a single piece.

Still another object is to provide a mold means which enables a "transitional" portion to be formed to the horn portion of the antenna, whereby optimum coupling of the electro-magnetic waves is achieved between the horn and the associated wave guide of the transmitter or receiver system. A related object is to form the transitional portion to couple with a wave-guide and/or co-axial feed or receive system.

BRIEF DESCRIPTION OF THE DRAWINGS

Referring to the drawings, in which the same characters of reference are employed to indicate corresponding or similar parts throughout the several Figures of the drawings.

DESCRIPTION OF THE PREFERRED EMBODIMENT

Figure 1:
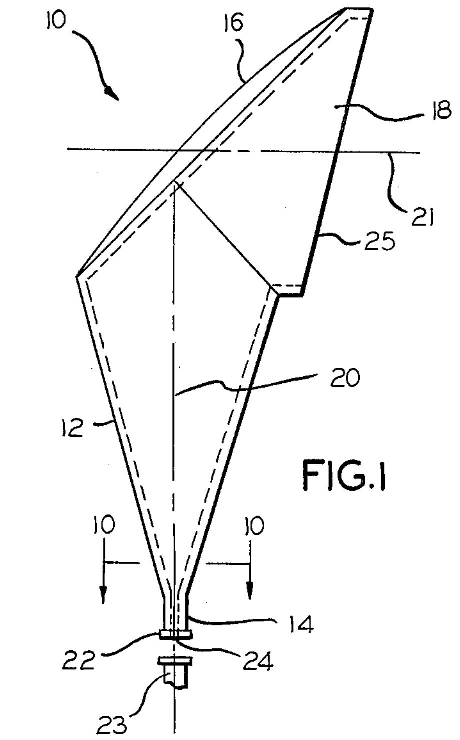
FIG. 1 is a side view of a one piece conical horn-reflector antenna having a wave guide transitional portion integrally formed at the vertex end thereof, formed in accordance with the principles of the invention.
Figure 2:
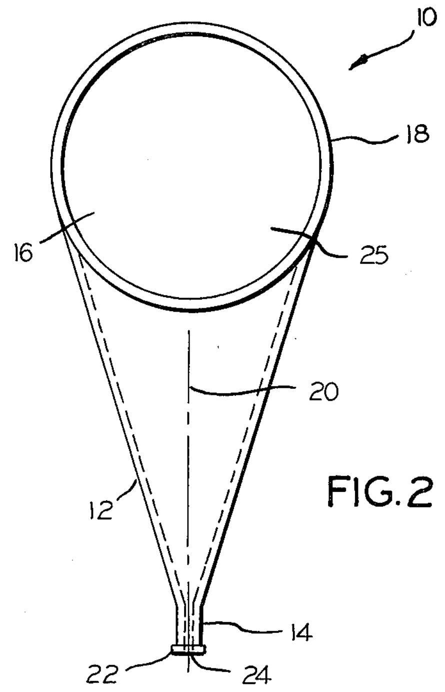
FIG. 2 is a front view of the antenna in FIG. 1.

Referring now more particularly to FIGS. 1 and 2 of the drawings, the reference numeral 10 indicates generally a conical horn-reflector antenna formed in a single piece and in accordance with the principles of the invention. The antenna 10 includes a conical horn portion 12 having an extended apex end portion 14, a paraboloid-reflector portion 16 and a cylindrical portion 18. The central axis 20 of the horn 12 is perpendicular to the central axis 21 of the cylindrical portion 18. The focal point of the paraboloid of revolution of portion 16 lies on the central axis 20.

The apex end 14 includes a collar 22 for connecting to a wave guide 23 (FIG. 1). The apex 14 may be formed into a suitable termination to mate with a circular, square, elliptical, rectangular or ridged wave guide. The opening 24 leading into the apex end 14 may also be formed into any desired configuration, such as circular for example, to enable transitional mating with a wave guide and/or coaxial cable feed or receive systems.

The cylindrical portion 18 defines an inclined circular projectile aperture 25 at the forward end thereof and the opposite rear end is defined by the paraboloid portion 16. For transmitter operation, the parabolic reflector portion 16 reflects the diverging spherical electromagnetic waves from the horn 12, so that the waves radiate from the circular aperture 24 having planar or flat wave fronts. For receiver operation the reverse occurs.

Turning now more specifically to FIGS. 3 through 8, a male plug mold indicated generally by the reference numeral 26, for forming antenna 10 will now be described. Mold 26 includes a hollow paraboloid-cylindrical section 28 and a cone part 30 formed from a pair of half cone shells 32, 33.

The paraboloid-cylindrical section 28 includes an outer cylindrical side surface 36, an outer parabolic end surface 38 and an outer inclined open end face 40. Although other dimensional relationships may be suitable, the bottom side 41 of section 28 is shown substantially longer than the top side 42.

A threaded socket 44 is mounted in section 28 adjacent the paraboloid surface 38 and at a position upward from a cut out 45 (FIG. 5) formed in the bottom side 41 of cylinder section 28. As may be seen from the drawings, socket 44 lies on a plane substantially perpendicular to the longitudinal axis of the cylinder 36. Cut out 45 provides an access opening between cone part 30 and section 28.

The shells 32, 33 are substantially identical and extend along the entire longitudinal length of cone part 30. An opening 46 (FIG. 6) extends through the vertex end 47 of cone part 30, when the shells 32, 33 are assembled. As may be seen in FIG. 3, the inner abutting edges 48 of the shells 32, 33 are flat and extend in the vertical direction along a line substantially identical to the axis 20 of the cone portion 12 of antenna 10.

Figures 5, 6:
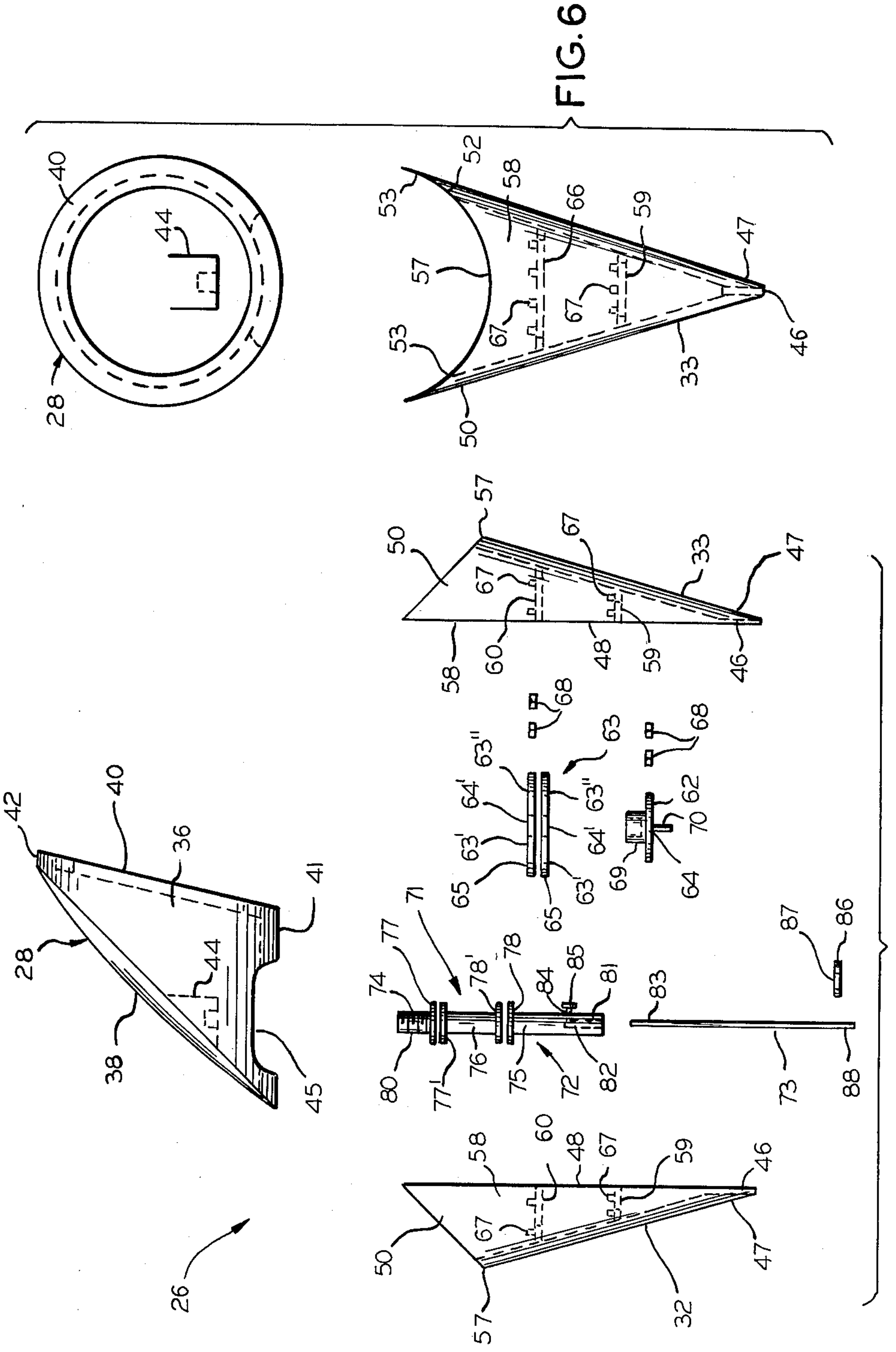
FIG. 5 is a side view of the disassembled component parts of the mold in FIG. 3.
FIG. 6 illustrates the front view of the paraboloid-cylindrical section and one of the half cone shells of FIG. 5.

Each shell 32 and 33 includes an upper front portion 50 and an upper rear portion 52 (FIGS. 5 and 6). These upper front and rear portions 50 and 52 have concave inner surfaces 53, to embrace respectively the front and rear convex surface 36 of the cylindrical section 28. The upper outer side edges 57 (FIG. 6) of each shell 32 and 33 are also concave, to embrace the bottom convex side 41 of the cylindrical section 28.

Figure 4:
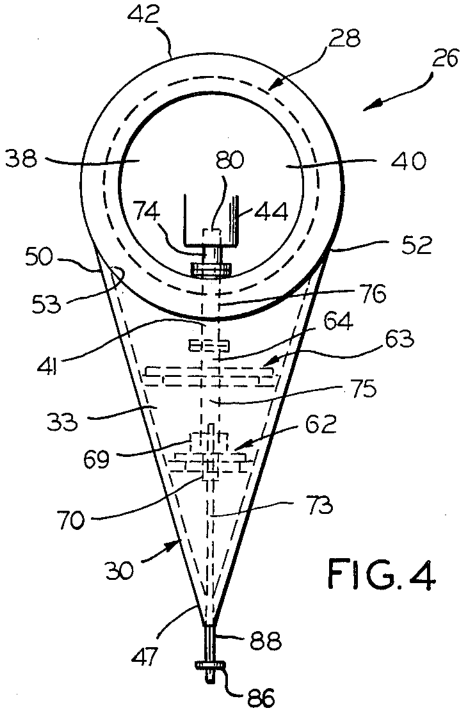
FIG. 4 is a front view of the mold in FIG. 3.

Viewing more particularly FIGS. 4 and 6, the upper front and rear portions 50, 52, may be further described as the remaining front and rear portions of a solid cone, after being intersected by a cylinder at a vertical level of the cone where the cross-sectional diameter is greater than the cross-sectional diameter of the intersecting cylinder.

Figure 3:
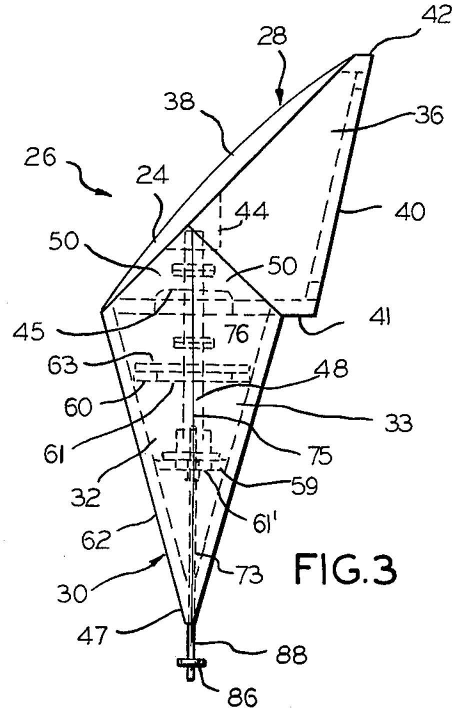
FIG. 3 is a side view of an assembled mold used in forming the antenna in FIG. 1.

The inside wall 58 of each shell 32 and 33 includes a lower semi-circular flange 59 spaced vertically from an upper semi-circular flange 60 (FIGS. 3 and 5). When the shells 32, 33 are brought together to form cone part 30, the semi-circular flanges 59, 60 form respectively a continuous lower circular ledge 61 and a continuous upper circular ledge 61′ (FIG. 3).

Figure 8:
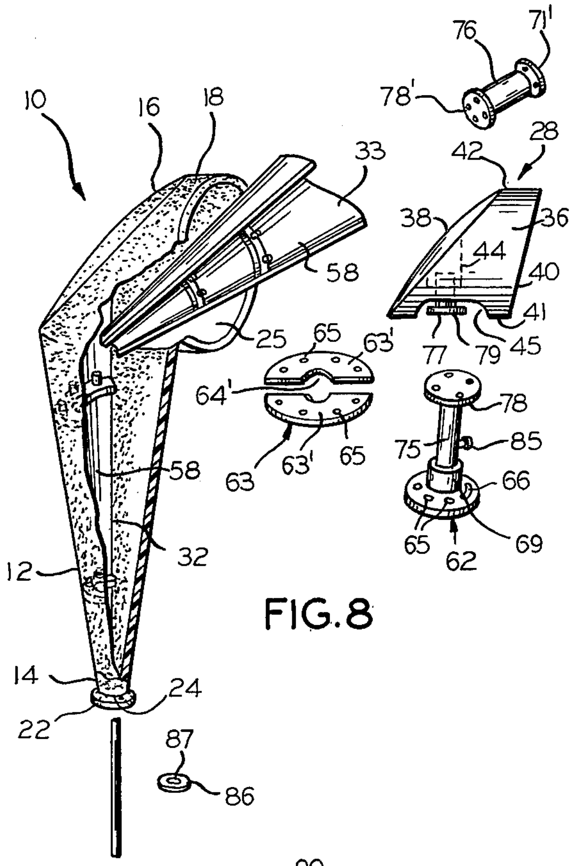
FIG. 8 shows the formed antenna fragmented, to illustrate one of the half cone shells being removed from the antenna, with a portion thereof extending inside the other half cone shell, after the cylindrical section, rod, and rings have been removed via the antenna circular aperture.

A lower ring 62 is supported on the lower flanges 59 and an upper ring 63 is supported on the upper flanges 60 (FIGS. 3 and 5). The upper ring 63 as shown in FIGS. 5 and 8, may be split into two equal halves 63′, 63′ along a diameter line 63″ (FIG. 8). The lower ring 62 includes a central hole 64, and a plurality of smaller holes 65 and an arcuate opening 66 adjacent the periphery. Similarly, the upper ring 63 includes periphery holes 65, and the hole 64 which consists of the semi-circular openings 64′ of the split halves 63′, 63′ of ring 63 when these halves are secured together on the upper flanges 60.

Studs 67 (FIG. 9) are mounted to and extend upward from the flanges 59, 60 to pass through the ring holes 65 and arcuate opening 66. The outer ends of the studs 67 may be threaded to screw onto a nut 68. Alternatively, the studs 67 may press fit in the holes 65.

The lower ring 62 includes a threaded socket 69 extending upward from the upper surface of ring 62 and a hollow sleeve 70 extending downward from the lower surface thereof (FIGS. 5 and 8). The inside of socket 69 and sleeve 70 are aligned with the central hole 64 of ring 62.

A rod means indicated generally by the reference numeral 71 (FIGS. 3, 4 and 5) is used for rigidly attaching the paraboloid-cylindrical section 28 with the cone part 30. Rod means 71 comprises an extension rod 72 and a bar member 73. With particular reference to FIG. 5, it will be seen that rod 72 is formed from a plurality of segments and comprises an upper segment 74, a lower segment 75 and an intermediate segment 76 for attachment therebetween. The inner ends of the upper and lower rod segments 74, 75 include respectively flanges 77, 78 which are attached to flanges 77′ 78′ of the intermediate rod segment 76. The flanges 77 and 77′ and flanges 78 and 78′ may be bolted together in the same manner as the rings 62, 63 are bolted to the corresponding ledges 61 and 61′. To expand the length of the segmented rod 72, more than one or a longer intermediate segment 76 may be used; and conversely, to contract the length of the segmented rod 72, segment 76 could be deleted or a shorter length segment 76 may be used.

The upper rod segment 74 includes a threaded upper end 80 for connecting in socket 44 of the paraboloid-cylindrical section 28, and the lower rod segment 75 includes a threaded lower end 81 for connecting in socket 69 of the lower ring 62. A bore 82 is formed centrally in the lower end 81 of lower rod section 75 to receive the upper end 83 of the bar member 73 in a tight-fit relationship. A set screw 84 having a side tightening knob 85 locks the bar in place.

The bar 73 as shown, extends through opening 46 in the apex 34 of the cone part 30 of the mold 26. A detachable collar 86 having an opening 87 pressfits on the bottom end 88 of the bar 73.

When assembling the male mold 26 for forming the antenna 10, the shells 32, 33 are first rigidly secured together to form the cone part 30. The inner vertical edges 48 of the shells 32, 33 are placed in an abutting relationship (FIG. 3), and the lower and upper flanges 59, 60 respectively align into circular continuous ledges 61, 61′, (FIG. 3).

The lower ring 62 is positioned on the studs 67 of the lower flanges 59. The enlarged arcuate opening 66 of ring 62 facilitates the aligning of the periphery holes 65 with the studs 67. The nuts 68 are tightened to bolt ring 62 to flanges 59.

The threaded end 81 of the lower rod segment 75 is screwed into ring socket 69. As may be seen in FIGS. 3 and 4, the upper end of the lower rod segment 75 extends above the upper ledge 61′.

The bar member 73 is now inserted through apex opening 46, and the upper end thereof is passed through the sleeve 70 and central hole 64 of ring 62, until finally reaching bore 82 of the lower rod segment 75. Set screw 84 is tightened to secure the bar 73 in place. The detachable collar 86 is press-fitted on the bottom end 88 of the bar member 75 which is on the outside of cone part 30.

Figure 9:
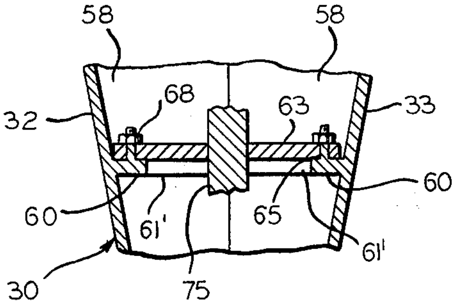
FIG. 9 illustrates securing means for fastening the rings to the flanges on the inside of the half cone shells.

The split halves 63′ of ring 63 are placed on the studs 67 of the upper flanges 60 and bolted to the upper flanges 60 by tightening the nuts 68. The ring halves 63′ are positioned around the upper part of lower rod segment 75, so that the split diameter line 63′ lies orthogonal to the plane of the abutting edges 48 of the half cone shells 32, 33 as shown in FIG. 9. The upper part of rod segment 75 is tightly received inside the hole 64 of ring 63. Thus, the cone part 30 is rigidly assembled and the lower rod segment 75 is locked on the axis of cone part 30 by the socket 69 of lower ring 62 and ring 63.

Figure 7:
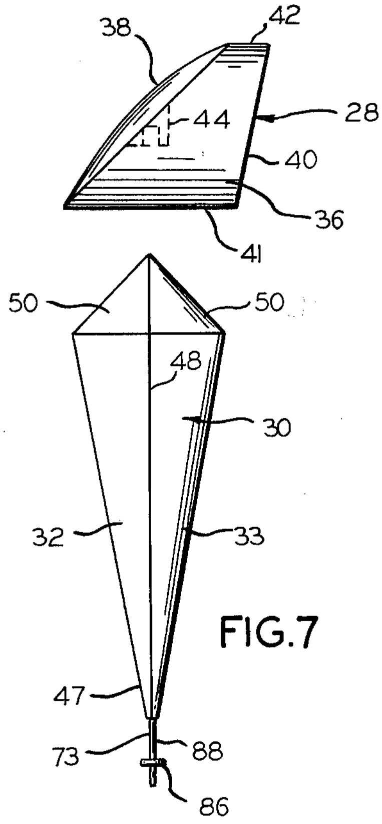
FIG. 7 is a perspective view of the mold with the cylindrical section spaced from the assembled cone part.

The upper threaded end 80 of segment 74 is now screwed into socket 44 of the paraboloid-cylindrical section 28. As may be seen in FIGS. 3 and 4, the lower end of segment 74 is above the access opening 45 of section 28. The paraboloid-cylindrical section 28 is then placed in approximately the proper relationship with cone part 30 (FIG. 7). Section 28 is sandwiched between the upper front and rear portions 50, 52 respectively of shells 32, 33 (FIG. 4). The concave inside surfaces 53 embrace the front and rear convex surface 36 of section 28, and the concave outer side edges 57 embrace the bottom side 41 of section 28.

The upper front and rear portions 50, 52, in addition to providing support, serve as guides to insure the proper positioning of the paraboloid-cylindrical section with the shells 32, 33. Particularly note, that due to the front and rear portions 50, 52 one shell is always closer to end face 40 than the other shell. Thus, shell 33 is closer to end face 40 than shell 32.

The assembly of rod means 70 is completed by bolting flange 78 of the lower segment 75 with flange 78' of the intermediate segment 76; and bolting flange 77 of the upper segment 74 with flange 77 of the intermediate segment 76. Alternatively, flanges 78, 78' of lower segment 75 and intermediate segment 76 may be bolted together prior to placing the paraboloid-cylindrical section 28 into association with cone part 30; and then bolting the flanges 77, 77' of the upper and intermediate segments 74 and 76 together after section 28 is in place.

The lower end of the intermediate segment 76 is inside the cone part 30, whereas the upper end is inside the paraboloid-cylindrical section 28. The opening 45 in section 28 communicating the inside of cone 30 with the inside of section 28, must be of sufficient size to enable convenient access inside the cone part for bolting and unbolting the rod segments 75 and 76.

The completely assembled rod means 71 provides an exact and rigid alignment of the paraboloid-cylindrical section 28 with cone part 30. Thus, bar member 73 is locked in place at the upper end 83 with set screw 84 and the lower end 88 is confined within apex opening 46. The extension segmented rod 72 is locked in position along the longitudinal axis of cone part 30 by the threaded opposite ends 80 and 81 respectively screwed into the fixed sockets 44 and 69. Between such secured ends, the upper ring 63 further maintains the segmented rod means 72 in place.

The assembled mold 26 is a hollow unit designed to provide convenient access inside the paraboloid-cylindrical section 28 and cone part 30 after antenna 10 is fabricated. Thus, the opening 45 in section 28 and the open end face 40 must be of sufficient size to enable the various rod segments to be bolted and unbolted, and the various mold parts to be removed as will be further referred to below.

After the paraboloid-cylindrical section 28 and the shells 32 and 33 have been assembled as afore-described, the antenna 10 (FIGS. 1 and 2) is formed to the precise shape and contour of the mold 26. Thus, the concave inner surface of antenna 10 will be substantially identical to the convex outer surface of the mold 26.

Figure 10:
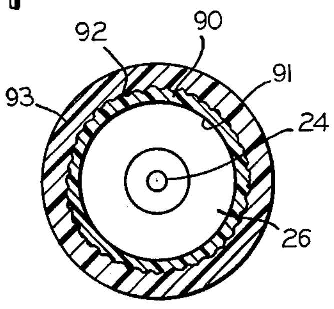
FIG. 10 is an enlarged cross-sectional view of the conical horn, taken on the plane of the line 10—10 in FIG. 1 to illustrate the component layers of the antenna.

The antenna 10 may be fabricated by initially applying an extremely thin coat of parting agent (not shown) over the mold 26 to insure ease in the subsequent removal of the component mold sections. The parting agent must present a tough and non-penetrable surface to sprayed metal. A film or layer of metal 90 (FIG. 10) is applied over the parting agent, to produce a smooth metal inner face 91 which is a precise reproduction of the contour of the mold surface. A preferred means for applying the metal to the mold is by spraying fine particles of sprayed metal on the outer surface 92 of mold 26, until there is a sufficient build up of metal to form a predetermined thickness of the metal layer 90. The beating of the fine particles of the sprayed metal against the smooth mold surfaces, provides the desired surface reproduction on the inner surface 91 of the metal layer 98. The outer surface 92 of the metal layer 90 is coarse and irregular in contour.

A layer of plastic 93 is then applied over the metal layer 90. The plastic 93 is preferably in a liquid state, so it readily flows over the metal layer and impregnates throughout the pores thereof. Upon hardening, a secure bond is effected between the metal and plastic layers 90 and 93. The plastic layer 93 provides mechanical support for the antenna. Thus, the metal layer 90 is substantially thinner than the plastic layer 93. In this manner, antenna 10 is fabricated into a single piece, and conforms to the contour of mold 26. The extended apex portion 14 conforms to the contour of the detachable collar 86 and that part of the lower end 88 of bar member 73 between the collar 86 and the apex end 47 of the cone part 30.

After the antenna 10 has been fabricated and the component layers thereof have sufficiently hardened, the mold 26 is dis-assembled for removal from the antenna 10. Turning now more particularly to FIG. 8, the procedure for removal of the component parts of mold 26 from the antenna 10 will be described.

First, the paraboloid-cylindrical section 28 is freed from the cone part 30. This is done by unbolting flanges 77, 77' and flanges 78, 78' and lifting the intermediate segment 76 of segmented rod 72 out of cone part 30 via access opening 45 and into the paraboloid-cylindrical section 28; and then segment 75 is passed through mold end face 40 and antenna aperture 22 for removal from the antenna.

The paraboloid-cylindrical section 28 is next extracted from the antenna through aperture 22. There is no need to unscrew the upper threaded segment 74 of the segmented rod 72.

Now the upper ring 63 is readily accessible and is unbolted from the upper flanges 60 of the shells 30, 33 and the split halves 63', 63' of the upper ring 63 are lifted upward into the inside of the antenna cylindrical portion 18 and removed via antenna aperture 22. The removal of the upper ring 63 provides access to the lower ring 62.

The detachable collar 86 is removed from the bottom end 88 of bar member 73; and set screw 84 is unloosened from the upper end 83 of the bar member 73.

The lower ring is now unbolted and together with the lower segment 75 of the rod 72 is lifted out of the cone part 30, into antenna cylindrical portion 18 and out of the antenna through aperture 22.

The bar member 73 is shown in FIG. 8 removed in a downward direction via the vertex opening 46 of cone part 30 and the antenna apex opening 24. However, this may not be convenient and bar member 73 may also be extracted from antenna aperture 22.

Thus, bar member 73 may be drawn up and out of antenna apex opening 24 and apex opening 46 of cone part 30; and thereafter further lifted through cone part 30 and finally out from aperture 22.

Since the rings 62, 63 have been unbolted and removed, the shells 32, 33 are no longer fastened together. The shell 33, which is nearest to the aperture 22, is raised and then tilted toward the aperture 22. The lower end of shell 33 which is part of the apex 47 when the shells are assembled, is passed through the hollow of shell 32, as shell 33 is moved longitudinally through the length of the conical horn portion 12 of antenna 10 and into the antenna cylindrical portion 18. The shell 33 is then removed from the antenna via the aperture 22. Finally, shell 32 is also removed from the antenna through aperture 22. Thus, it is seen that shell 33 must be removed first. Since the part of mold 26 are all rigid, they may be later again assembled into mold 26, and reused for forming another identical antenna 10.

Figure 11:
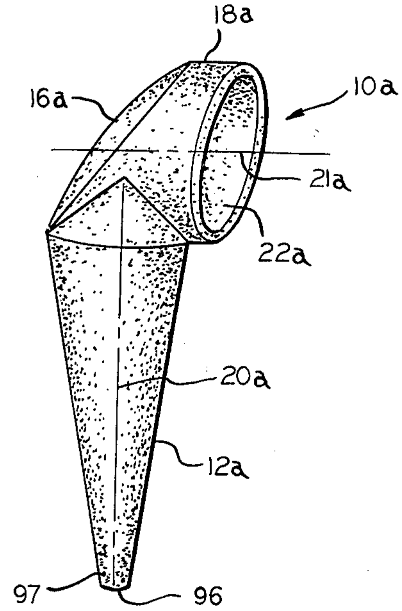
FIG. 11 is a perspective view of another conical horn reflector antenna, formed in accordance with the principles of the invention.

With particular reference to FIG. 11, reference designation 10a indicates generally another type conical horn-reflector antenna, embodying the principles of the invention, which is also formed in a single piece. The reference designation 26a in FIGS. 12, 13 and 14 indicate generally a male plug for forming antenna 10a. Similar parts will be designated by the same numeral with respect to antenna 10 and mold 26, but also include the suffix "*a*". Thus, antenna 10a includes a conical horn portion 12a, a paraboloid-reflector portion 16a and a cylindrical portion 18a. The central axis 20a of the horn 12a is perpendicular to the central axis 21a of the cylindrical portion 18a. The outer end of cylindrical portion 18a includes a circular aperture 22a. A circular opening 96 is formed at the apex end 97 of horn portion 12a.

The mold 26a for fabricating antenna 10a includes a hollow paraboloid-cylindrical section 28a and a cone part 30a formed from a pair of half cone shells 32a, 33a. Section 28a includes an outer cylindrical side surface 36a with the bottom side 41a longer than the top side 42a thereof, an outer parabolic end surface 38a, and an outer open end face 40a. A socket 44a is mounted in section 28 upward from an access cut out opening 45a which is formed in the bottom side 41a.

Each shell 32a and 33a includes an upper front portion 50a and an upper rear portion 52a, each having a concave inner surface 53a to embrace respectively the front and rear convex surface 36a of section 28a. The upper outer side edges 57a of each shell 32a and 33a are also concave to embrace the bottom side 41a of the cylindrical section 28a.

Figure 12:
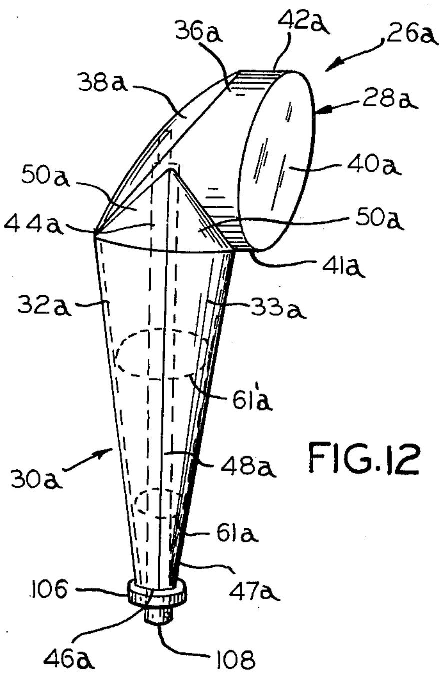
FIG. 12 is a perspective view of an assembled plug mold used in the formation of the antenna in FIG. 11.
Figure 13:
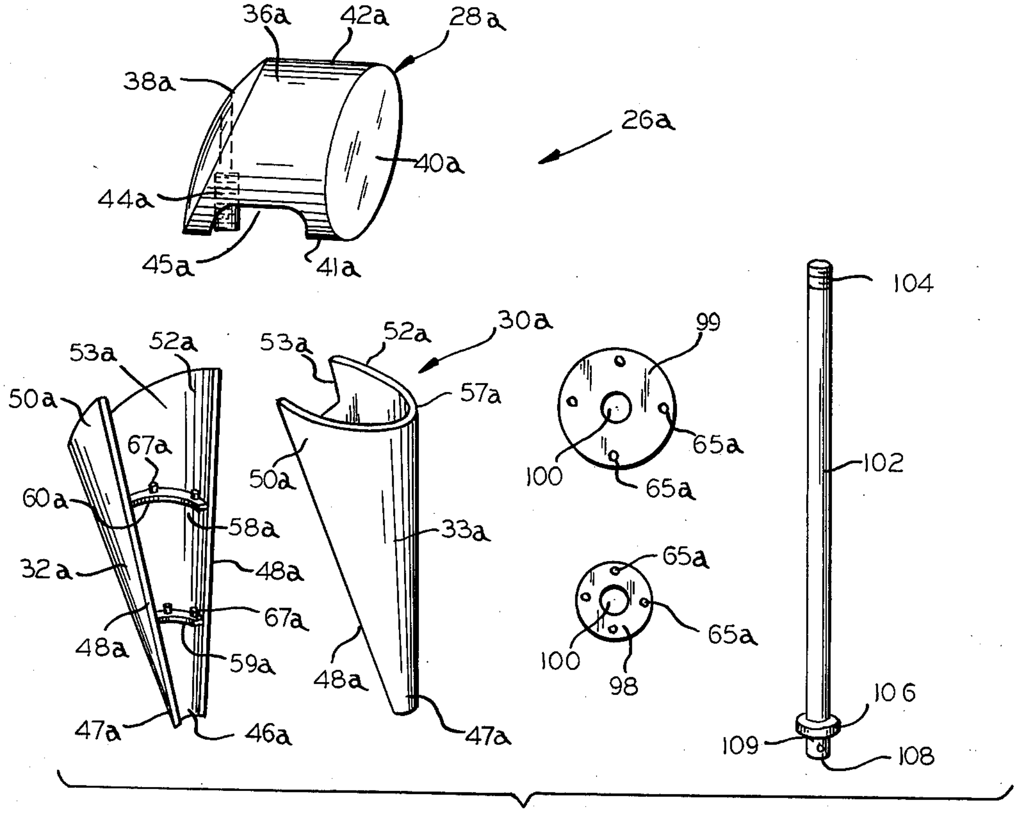
FIG. 13 is a perspective view of the disassembled parts of the plug mold in FIG. 12.

The inside wall 58a of each shell 32a and 33a includes a lower semi-circular flange 59a and an upper semi-circular flange 60a. When shells 32a, 33a are brought together to form cone part 30a, the semi-circular flanges 59a, 60a form respectively continuous circular lower and upper ledges 61a and 61'a (FIG. 12). Studs 67a are mounted to and extend upward from flanges 59a, 60a.

A lower ring 98 and an upper ring 99 are supported respectively on lower flanges 59a and upper flanges 60a. Each ring 98, 99 includes a central opening 100 and periphery holes 65a to receive the studs 67a. The outer end of the studs 67a may be threaded to screw onto a nut 68a.

A single cylindrical rod 102 is used to attach the paraboloid-cylindrical section 28a with cone part 30a. The upper end 104 of rod 102 is threaded. The cross-sectional diameter of rod 102 is dimentionally the same or just slightly less than the diameter of central holes 100 of the rings 98, 99. A circular collar 106 may be integrally formed to or otherwise rigidly attached to rod 102, at a short distance from the bottom edge 108; with such distance providing a handle 109 to enable gripping or hand manipulation of the rod 102.

The rod 102 operatively extends through holes 100 in a tight fitting relationship with the rings 98, 99 when such rings are bolted to the flanges 59a, 60a. The upper end 104 is threadedly received in socket 44a. The socket 44a, central holes 100 and apex opening 46a are each aligned along the longitudinal axis 20a of cone part 30a, when the plug mold 26a is assembled.

When assembling the male mold 26a for forming the antenna 10a, the cone shells 32a, 33a are first rigidly secured together to form the cone part 30a. The inner vertical cone edges 48a of each cone shell are placed in an abutting relationship and the lower and upper flanges 59a, 60a respectively align into the circular continuous ledges 61a, 61'a (FIG. 12).

The lower ring 98 and then the upper ring 99 are bolted to the flanges 59a, 60a by screwing the nut 68a onto the studs 67a, which extend through the periphery holes 65a. The central holes 100 of the rings 98, 99 are in alignment with the apex opening 46a along the longitudinal axis of the cone part 30.

The rod 102 is inserted through the apex opening 46a, and then forced through the central holes 100 of the rings 98 and 99 until the upper end 104 of the rod 102 extends just above the upper ring 99. The paraboloid-cylindrical section 28a is placed in association with cone part 30a, and as may be seen from FIG. 12 is sandwiched between the upper front and rear portions 50a, 52a respectively of the cone shells 32a, 33a. The concave inside surfaces 53a embrace the front and rear side of section 28a, and the concave outer side edges 57a embrace the bottom side 41a of section 28a (FIG. 1).

The upper end 104 of the rod 102 is now screwed into the socket 44a, of the paraboloid-cylindrical section. The collar 106 abutts the inner end of apex 47a of the cone part 30a. Now the mold 26a is ready for forming antenna 10a. The association of the rod 102 with the socket 44a and rings 98, 99 provides an exact and rigid alignment of the paraboloid-cylindrical section 28a with the cone part 30a.

The upper front and rear portions 50a, 52a, in addition to providing support, serve as guides to insure the proper positioning of the paraboloid-cylindrical section 28a with cone shells 32a, 33a. Due to the front and rear portions, one cone shell is always closer to the aperture 22a of the antenna than the other cone shell, and as shown in FIG. 8 cone shell 33a is closer to antenna aperture 22a than cone shell 32a.

Figures 14, 15, 16, 17, 18:
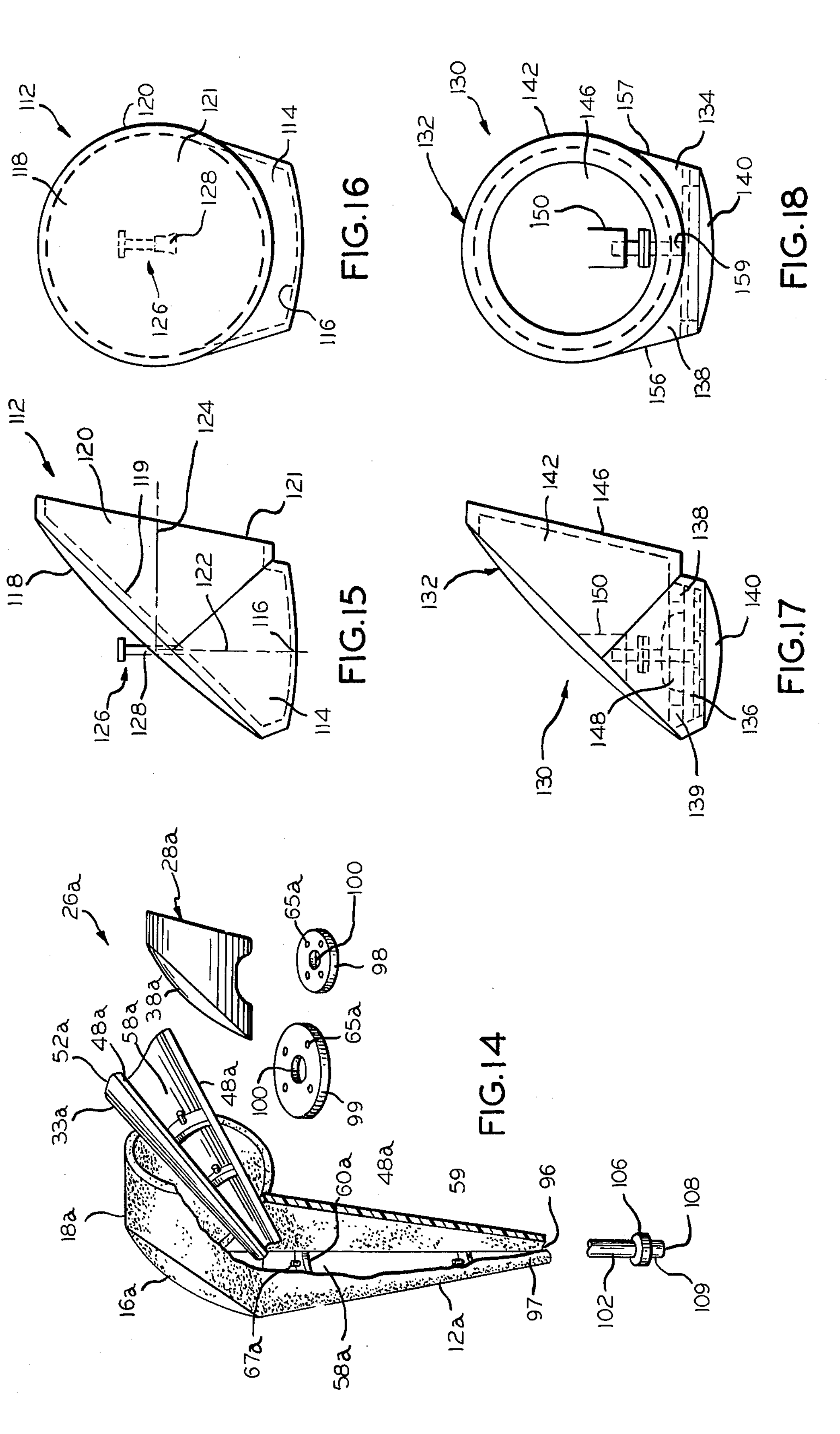
FIG. 14 shows the formed antenna of FIG. 11 fragmented, to illustrate one of the half cone sections being removed from the antenna, after the cylindrical section has been removed.
FIG. 15 is a side view of another type horn-reflector antenna, embodying the principles of the invention, in which the horn portion in FIG. 1 is partially replaced with a bottom subordinate reflecting surface.
FIG. 16 is a front view of the antenna in FIG. 15.
FIG. 17 is a side view of an assembled mold used in forming the antenna in FIG. 15.
FIG. 18 is a front view of the assembled mold in FIG. 17.

After the antenna 10a has been fabricated and the component layers thereof have sufficiently hardened, the mold 26a is disassembled for removal from the antenna 10. Turning now specifically to FIG. 14, the outer end 104 of rod 102 is first unscrewed from the socket 44a of the paraboloid-cylindrical section 28a, and then pulled inwardly away from the apex 47a, until the upper end 104 is completely below the upper outer edges 57a of the cone shells 32a, 33a. The paraboloid-cylindrical section 28a is then pulled out from the antenna 10a through the aperture 22a. If rod 102 had not been previously removed from cone part 30a, it should now be fully pulled out from the apex opening 46a.

The upper ring 99 and then the lower ring 98 are unbolted respectively from the studs 67a of the flanges 60a and 59a and raised upward and out of the cone part 30a into the cylindrical portion 18a and finally removed from the antenna via aperture 22a.

The cone shell 33a, which is nearest to the aperture 22a is raised and then titled toward the aperture 22a. The apex 47a of cone shell 33a passes through the hollow of cone shell 32a as cone shell 33a is moved longitudinally through the length of the conical horn portion 12a of antenna 10a and into antenna cylindrical portion 18a. The shell 33a is then removed from the antenna via the aperture 22a. Finally, cone shell 32a is also removed from the antenna through aperture 22a.

Turning now specifically to FIGS. 15 and 16, the reference numeral 112 indicates generally a single-piece horn reflector antenna, referred to in the art as a Cassagrain horn reflector, which is another embodiment of the subject invention. The antenna 112 includes a truncated horn portion 114 having a subordinate bottom reflector surface 116, a paraboloid reflector portion 118 having an inner main paraboloid reflecting surface 119, and a cylindrical portion 120. The forward end of such cylindrical portion 120 includes an aperture 121 through which the electromagnetic energy is radiated or received, and the opposite or rear end of the cylindrical portion 120 is defined by the paraboloid portion 118. The central axis 122 of the horn portion 114 is perpendicular to the central axis 124 of the cylindrical portion 120.

A feed horn 126 is positioned at the junction of the horn axis 122 and the cylindrical axis 124. The forward end 128 of a feed horn 126 projects through the paraboloid reflector portion 118.

The subordinate reflector surface 116 is shown parabolic but under certain conditions may be flat, hyperbolic or other suitable shape as required by the design geometry. The main reflector surface 119 is also shown parabolic. However, in some instances when the subordinate reflector surface 116 is parabolic the main reflector surface 119 may be flat.

In operation, electromagnetic wave energy from the feed horn 126 is radiated along the central horn axis 122 toward the sub-reflector bottom surface 116. The sub-reflector surface 116 redirects the electromagnetic waves to the main reflector surface 119. The redirected energy is reflected by the main reflector surface 119 along the cylindrical axis 124, and finally radiated to the outside via the aperture 121. Thus, the conical wave fronts radiating from the horn are converted to planer wave fronts by the main reflector 119.

Referring now specifically to FIGS. 17 through 21, a male plug mold indicated generally by the reference numeral 130, for forming antenna 112, will be described.

The plug mold 130 includes a hollow parabolic-cylindrical section 132, a truncated cone section 134 fabricated from a pair of symetrical shells 136, 138 and a bottom sub-reflector cap 140.

The paraboloid-cylindrical section 132 includes an outer cylindrical surface 142, an outer parabolic end surface 144 and an outer open-end face 146. An opening 148 (FIG. 19) extends through the bottom 149 of surface 142. Opening 148 provides access inside the truncated section 134, when the sections 136 and 138 are associated together.

A threaded socket 150 is mounted in the parabolid-cylindrical section 132, adjacent the paraboloid surface 144 and at a position upward from opening 148. Socket 150 lies substantially perpendicular to the central axis of 151 paraboloid-cylindrical section 132.

The shells 136, 138 extend the vertical length of the truncated cone section 134. The base end 152 of each shell 136, 138 includes an opening 153.

Figure 19:
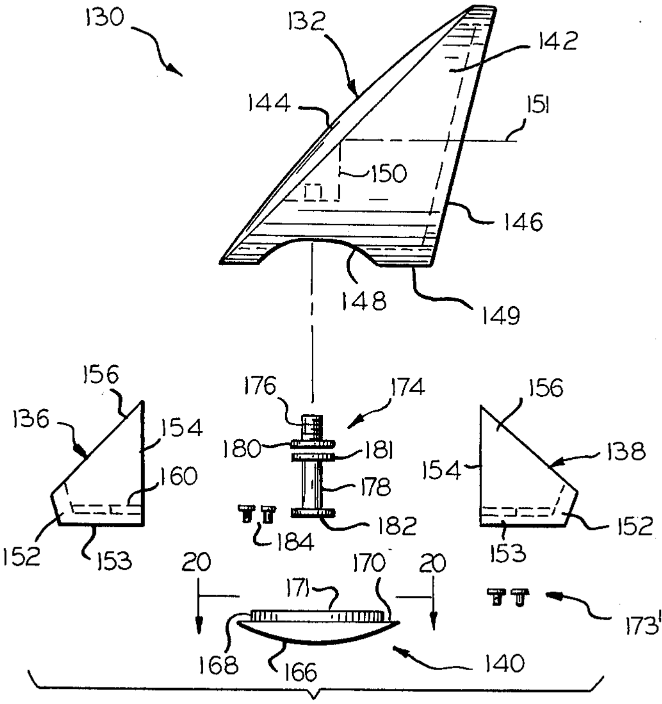
FIG. 19 is a side view of the component parts of the mold in FIG. 17.
Figure 20:
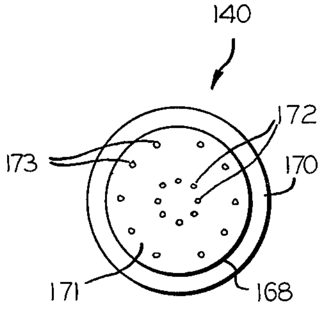
FIG. 20 is a top view of the base part of the horn section of the mold, taken on the plane of the line 20—20 in FIG. 19 and viewed in the direction indicated.
Figure 21:
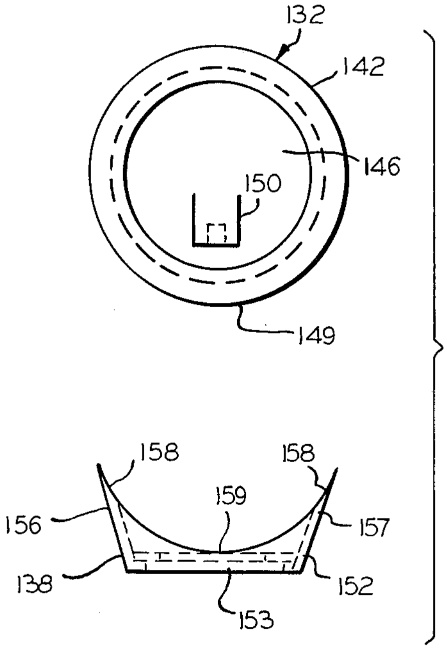
FIG. 21 is a front view showing the paraboloid-cylindrical mold part spaced from one of the half cone section shells of FIG. 20.

As may be seen in FIGS. 17 and 19, the inner faces 154 of the shells 136, 138 are flat and extend in the vertical direction along a plane substantially indentical to the plane passing through horn axis 122 of the antenna 112. When shells 136, 138 are assembled, the faces 154 are in an abutting relationship.

Each shell 136, 138 includes a front portion 156 and a rear portion 157 (FIG. 18). Each portion 156, 157 includes a concave inner surface 158 to embrace the front and rear convex surface of the paraboloid-cylindrical section 132. The shells 136, 138 further includes a concave upper side edge 159 to embrace the bottom convex surface 149 of section 132, as may be seen in FIGS. 18 and 21.

Semi-circular flanges 160 extend inward from the inside surface of shells 136, 138 adjacent the base ends 152. Holes 162 extend through the flanges 160. The flanges 160 form a continuous circular ledge 164 (FIG. 17) when the shells 136, 138 are assembled together into section 134.

The bottom cap 140 includes the lower surface 166, which forms the subordinate reflector antenna surface 116, a circular neck 168 which is received in openings 153 of the assembled shells 136, 138. A flat ring surface 170 extends around the neck 168. The top surface 171 of neck 168 includes a plurality of centrally positioned threaded holes 172 and periphery threaded holes 173. To secure the bottom cap 140 to the shells 136, 138, cap screws 173' extend from the inside of the shells and through the holes 162 in the flanges 160, for threaded attachment in the threaded periphery holes 173.

A rod means indicated generally by the reference numeral 174 is used for rigidly attaching the paraboloid-cylindrical section 132 with the truncated section 134.

The rod means 174 includes a top segment 176 and bottom segment 178. The upper end 180 of segment 176 is threaded for connection in the threaded socket 150 in the paraboloid-cylindrical section 132. The top and bottom rod segments 176, 178 include respectively flanges 180, 181, which are bolted together in any convenient manner to provide a rigid connection. The bottom segment includes a flange 182 having openings 183, which receive cap screws 184 for threaded attachment in the central holes 172 in the neck 168 of cap 140.

In assembly of the mold 130, the inner vertical faces 154 of shells 136, 138 are placed in an abutting relationship and flanges 160 align into the circular ledge 164. The bottom cap 140 is bolted to flanges 160, by the cap screws 184 passing through openings 183 in the flanges 160 and into the threaded holes 172 in the neck, 168 of the cap 140. The assembly of the truncated cone part 132 is now completed.

The threaded upper end 180 of top segment 176 of rod means 174 is screwed into socket 150 in the paraboloid-cylindrical section 132.

The paraboloid-cylindrical section 132 and assembled truncated cone 134 are placed in approximately the proper relationship with each other. Section 132 is sandwiched between the upper front and rear portions 156, 157 respectively of shells 136, 138. The concave inside surfaces 158 embrace the front and rear sides of the cylindrical surface 142, and the concave upper side edges 157 embrace the bottom convex side 149 of the cylindrical surface 142.

The bottom segment 178 is first secured to neck 168 of bottom 140 by passing cap screws through openings 183 of flange 182 for threaded attachment in holes 172. The flanges 180, 181 of the top and bottom segments 176, 178 are bolted together to complete the assembly of the rod means 174. This provides an exact and rigid alignment of the paraboloid-cylindrical section 132 with the cone section 134. The horn-reflector antenna 112 is now ready to be fabricated.

After the antenna has been fabricated, the mold 130 is disassembled for removal from the antenna 112. First, the flanges 180, 181 are unbolted, and flange 182 is unbolted from the neck 168 of the bottom cap 140. The bottom rod segment 178 is lifted out of the cone section 130 through access opening 148 and into the paraboloid-cylindrical section 132, and finally removed from the antenna 112, via the open-end face 146 of section 132 and antenna aperture 121. This frees the cylindrical-paraboloid section 132 from the cone section 134.

Now the cylindrical-paraboloid section 132 may be extracted through the antenna aperture 121.

The cap screws 173' are unscrewed from the periphery holes 173, which disconnects the shells 136, 138. Shell 138, which is nearest the aperture 121, is removed first via aperture 121, and therafter shell 136 is removed via aperture 121, in the manner previously described for male plug molds 26 and 26a.

After removal of shells 136, 138 the bottom subreflector cap 140 is lifted upward through the horn portion 114 into the reflector portion 118 and removed through aperture 121, to complete the removal of mold 130.

All the parts of the molds 26, 26a and 130 may be rigid, formed in part or entirely with a plastic material or other suitable material.

The description of the preferred embodiments of this invention is intended merely as illustrative of the subject invention, the scope and limits of which are set forth in the following claims.

We claim:

1. A mold apparatus for forming a single piece horn-antenna, said antenna having a horn portion and a reflector portion, said mold comprising:
- a reflector section for forming said reflector portion of the antenna, said reflector section including a cylindrical part having a convex outer surface;
- a horn part having a base end and an upper end, said upper end having a larger cross-sectional area than said base end with respect to parallel planes perpendicular to the central axis of said horn part; and
- securing means for removably attaching said horn part to said reflector section, prior to forming said single piece antenna, said securing means being detachable for removing said reflector section and said horn part from the formed antenna.

2. The mold of claim 1, wherein said horn part includes:
- a first section and a second section; and
- connecting means for removably assembling said first and second sections together.

3. The mold of claim 2, wherein said first and second sections are substantially identical and mate together along a plane passing substantially through the central axis of the horn part.

4. The mold of claim 2, wherein each of said horn sections includes a base end and an upper end, at least one of said sections of the horn being hollow to receive therein the base end of the other section during removal of said other section from the formed antenna.

5. The mold of claim 2, wherein each of said sections of the horn part is a hollow shell and includes a base end and an upper end, the inside cross-sectional areas of said shells progressively increasing from the corresponding said base end to said upper end.

6. The mold of claim 5 wherein said connecting means for assembling the shells includes:
- a ring member; and
- means for removably attaching the ring member to the inside of each of said shells for assembling said shells together.

7. The mold of claim 6 wherein said means for removably attaching the ring member to the shells includes:
- a flange extending inward from the inside of each of said shells for supporting said ring member, said ring member being removably attached to the flange.

8. The mold of claim 6, wherein said securing means includes:
- a hole formed in said ring member;
- a rod means for extending through said hole of said ring member; and
- means for removably securing the rod to the reflector section for removably securing the reflector section to the horn.

9. The mold of claim 5, wherein said connecting means for assembling the shells includes:
- an upper ring member and a lower ring member, said upper ring member having a greater diameter than said lower ring member;
- an upper flange and a lower flange extending inward from each of the shells; and
- means for attaching the upper and lower ring members respectively to the upper and lower flanges, and thereby securing the shells together.

10. The mold of claim 1, wherein said horn part includes:
- an upper front portion spaced from an upper rear portion, said cylindrical part being positioned between said upper front and rear portions.

11. The mold of claim 10, wherein said upper front and rear portions have concave inside surfaces for embracing respectively the front and rear convex sides of said cylindrical part.

12. The mold of claim 11, wherein said horn part includes concave opposed side edges for embracing the bottom of said convex surface of said cylindrical part.

13. The mold of claim 1, wherein said cylindrical part is hollow and includes an opening to provide access between the cylindrical section and said horn part when the reflector section and horn section are attached together.

14. The mold of claim 13, wherein one of the ends of said cylindrical part is open to provide access to the hollow inside of the cylindrical part.

15. The mold of claim 7, wherein said securing means for removably attaching said horn part to said reflector section includes:
- removable rod means for associating with the horn part and reflector section.

16. The mold of claim 15, wherein:
- said reflector section includes a threaded socket; and
- said rod means includes a threaded upper end for screwing into said socket.

17. The mold of claim 15 includes:
- removable securing means for securing said rod means in said horn part.

18. The mold of claim 16 includes:
- a threaded socket for positioning in said horn part; and
- a threaded bottom end of said rod means for screwing into said threaded socket of the horn part.

19. The mold of claim 17, wherein said removable securing means includes:
- at least one ring member including means for removably attaching in said horn part and means for fixidly attaching with said rod means.

20. The mold of claim 19, wherein said ring member includes a central opening dimensioned to provide a press-fit association with said rod means.

21. The mold of claim 19, wherein said ring member includes a threaded socket and said rod means includes a threaded bottom end for screwing into said socket of the ring member.

22. The mold of claim 15, wherein said removable rod means includes:
- a upper rod segment for removably associating with said reflector section;

a lower rod segment for removably associating with said horn part; and means for securing said upper and lower rod segments together for attaching said horn part and reflector section together.

23. The mold of claim 17, wherein said removable securing means includes:

a ring member split into two halves and removably attached in said horn part, each of said ring halves having a central opening, said ring member confining said rod means in said openings of the ring halves.

24. The mold of claim 15, wherein said antenna includes a transitional portion for coupling a wave guide to the horn part, said horn part including an apex end having an opening and said rod means further includes:

a bar member for passing said apex opening; and means for removably securing said bar member inside said horn part, a portion of said bar member extending outside said apex, said bar member defining the opening of said transitional portion of said antenna.

25. The mold of claim 1, wherein said horn part includes:

an open lower end; and a bottom end cap to define a subordinate reflecting surface for said antenna; and means for removably attaching said bottom end cap to said lower end of the horn.

26. The mold of claim 25, wherein said horn part includes a pair of half section shells, said end cap being removably attached to said shells.

27. The mold of claim 26 includes a rod means for removably securing said horn part to said reflector section.

28. The mold of claim 26 includes means for removably attaching said rod means to said bottom cap.

29. A mold for forming a single piece antenna including a reflector portion and a horn portion said mold comprising:

a reflector section for forming said reflector portion and having an outer surface to correspond to an electromagnetic wave reflecting surface of said antenna; a horn having a base end and an upper end, said upper end having a larger cross-sectional area than said base end with respect to parallel planes perpendicular to the central longitudinal axis of said horn section; and removable rod means for rigidly associating said reflector section with said horn section prior to forming said single piece antenna, said rod means being detachable for removing said reflector section and said horn section from the said formed antenna.

30. The mold of claim 29, wherein said rod means extends along a line substantially equivalent to the central axis of the horn section.

31. The mold of claim 29, wherein said rod means includes:

an upper segment;

a lower segment;

means for attaching said upper segment with said reflector section;

means for attaching said lower segment with said horn section; and means for attaching said upper segment with said lower segment.

32. The mold of claim 30, wherein said horn section includes an opening at the bottom end, and said mold further includes:

a cap for removable attachment to said horn section to cover said opening at the bottom of said horn section, said cap having an outer surface to correspond to a second electromagnetic wave reflecting surface.

33. The mold of claim 31, wherein said lower segment is attached to said cap and said means for attaching the lower segment with said horn sections includes means for attaching said cap with said horn section.

* * * * *